US012291333B1

(12) United States Patent
Theobald et al.

(10) Patent No.: US 12,291,333 B1
(45) Date of Patent: May 6, 2025

(54) SYSTEM AND METHOD OF PROVIDING A ROBOTIC RETRIEVAL SYSTEM IN A VEHICLE FOR USE IN DELIVERING ITEMS

(71) Applicant: Vecna Robotics, Inc., Waltham, MA (US)

(72) Inventors: Daniel Theobald, Somerville, MA (US); Siddharth Ram Chhatpar, Winchester, MA (US)

(73) Assignee: Vecna Robotics, Inc., Waltham, MA (US)

( * ) Notice: Subject to any disclaimer, the term of this patent is extended or adjusted under 35 U.S.C. 154(b) by 280 days.

(21) Appl. No.: 17/394,603

(22) Filed: Aug. 5, 2021

(51) Int. Cl.
| | | |
|---|---|---|
| *B64D 1/10* | (2006.01) | |
| *B60L 53/80* | (2019.01) | |
| *B60P 3/00* | (2006.01) | |
| *B64F 1/36* | (2024.01) | |
| *B64U 10/13* | (2023.01) | |
| *B64U 80/86* | (2023.01) | |
| *B64U 101/64* | (2023.01) | |
| *B65G 1/04* | (2006.01) | |
| *B65G 1/137* | (2006.01) | |
| *G06Q 10/0832* | (2023.01) | |

(52) U.S. Cl.
CPC ............... *B64D 1/10* (2013.01); *B60L 53/80* (2019.02); *B60P 3/007* (2013.01); *B64F 1/364* (2013.01); *B65G 1/0421* (2013.01); *B65G 1/137* (2013.01); *G06Q 10/0832* (2013.01); *B64U 10/13* (2023.01); *B64U 80/86* (2023.01); *B64U 2101/64* (2023.01)

(58) Field of Classification Search
CPC .................................................. B64C 39/024
See application file for complete search history.

(56) References Cited

U.S. PATENT DOCUMENTS

| | | | | |
|---|---|---|---|---|
| 9,815,633 B1 * | 11/2017 | Kisser | ................... | G01M 17/00 |
| 11,530,041 B2 * | 12/2022 | Leverman | ................. | B64C 1/22 |
| 11,667,383 B2 * | 6/2023 | Evans, II | ................. | B64D 1/12 |
| | | | | 244/137.4 |
| 11,679,494 B2 * | 6/2023 | Skaaksrud | ........... | H04B 1/3822 |
| | | | | 700/245 |
| 11,682,253 B2 * | 6/2023 | Skaaksrud | ................ | H02J 9/00 |
| | | | | 700/237 |

(Continued)

FOREIGN PATENT DOCUMENTS

| | | | |
|---|---|---|---|
| CN | 107539199 B | * 9/2017 | |
| EP | 3653500 A1 | * 5/2020 | ............ B25J 9/1682 |

OTHER PUBLICATIONS

Google Machine Translation of CN107539199B (Year: 2017).*

*Primary Examiner* — Jean Paul Cass

(57) ABSTRACT

An example system includes a vehicle having a platform, a linear slide configured on the platform, a robotic retrieval system configured on the linear slide, a shelf configured adjacent to the linear slide and a control system that controls a reception of a first item and a second item by the robotic retrieval system and a placement of the first item and the second item, by the robotic retrieval system, on the shelf. A drone can be configured to retrieve the first item or the second item from the robotic retrieval system on the vehicle and deliver the first item or the second item to a destination location. The vehicle can thereby enable delivery of many items without the vehicle stopping or even driving to a specific destination location.

18 Claims, 16 Drawing Sheets

(56) References Cited

U.S. PATENT DOCUMENTS

| | | | |
|---|---|---|---|
| 2016/0334276 A1* | 11/2016 | Pluvinage | G01J 3/027 |
| 2016/0376031 A1* | 12/2016 | Michalski | G05D 1/652 |
| | | | 701/15 |
| 2017/0316701 A1* | 11/2017 | Gil | B60P 3/11 |
| 2018/0229843 A1* | 8/2018 | Costanzo | B64U 10/14 |
| 2019/0161190 A1* | 5/2019 | Gil | G01S 19/15 |
| 2019/0220044 A1* | 7/2019 | Ruth | B64U 80/86 |
| 2019/0270591 A1* | 9/2019 | Lert, Jr. | B65G 1/0435 |
| 2019/0383052 A1* | 12/2019 | Blake | B60L 53/30 |
| 2022/0058300 A1* | 2/2022 | Pivac | B25J 9/1638 |
| 2022/0108273 A1* | 4/2022 | Miyata | G01C 21/3423 |
| 2022/0223056 A1* | 7/2022 | Dupray | G08G 5/0021 |
| 2023/0078448 A1* | 3/2023 | Cella | G06Q 10/06311 |
| | | | 705/7.13 |
| 2023/0083724 A1* | 3/2023 | Cella | B33Y 30/00 |
| | | | 705/28 |
| 2023/0098602 A1* | 3/2023 | Cella | B25J 9/1674 |
| | | | 700/248 |
| 2023/0102048 A1* | 3/2023 | Cella | B25J 9/1661 |
| | | | 700/248 |
| 2023/0123322 A1* | 4/2023 | Cella | G06Q 30/0202 |
| | | | 700/29 |
| 2023/0176557 A1* | 6/2023 | Cella | G05B 23/024 |
| | | | 700/117 |

\* cited by examiner

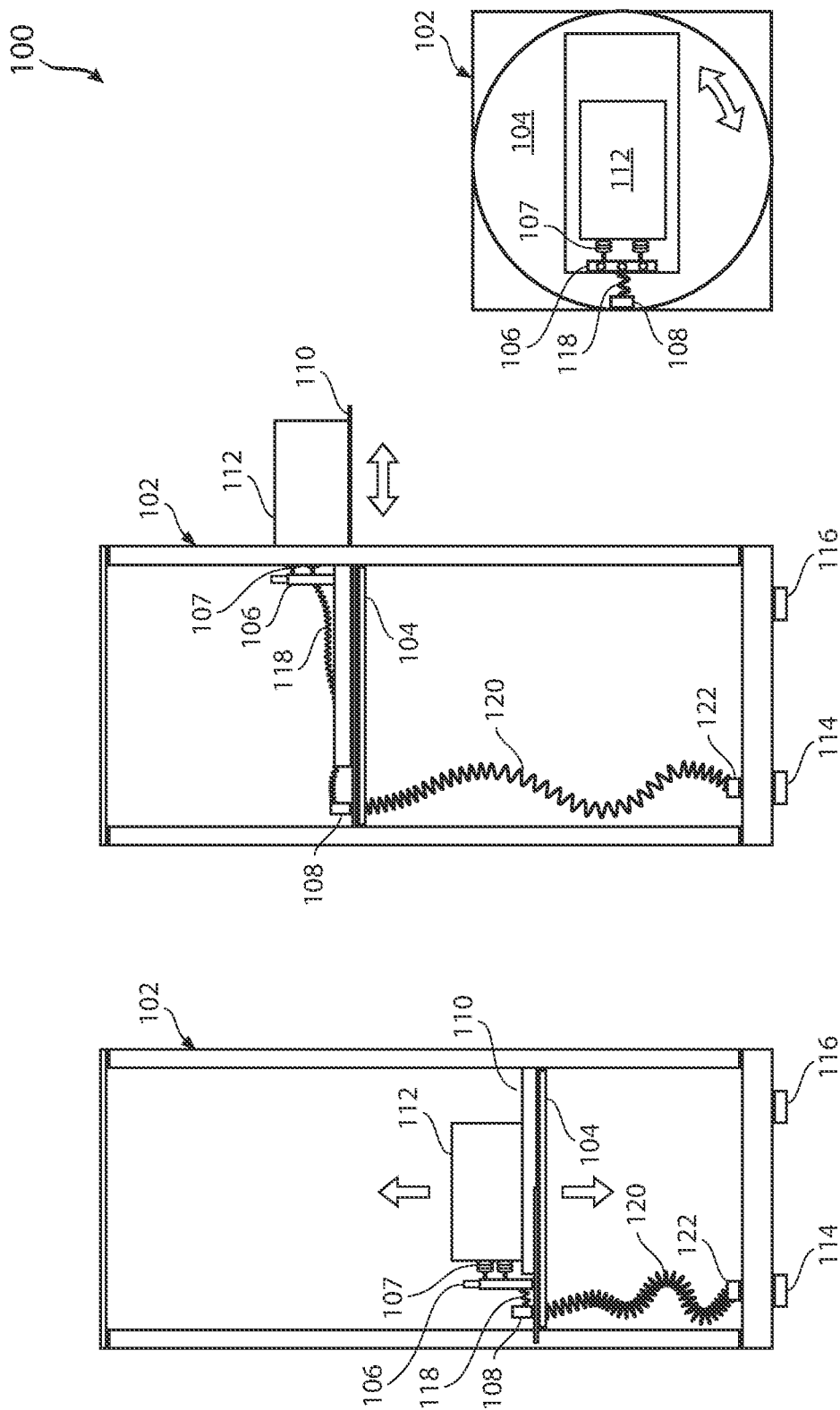

SYSTEM AND METHOD OF PROVIDING A ROBOTIC RETRIEVAL SYSTEM IN A VEHICLE FOR USE IN DELIVERING ITEMS

FIELD OF THE INVENTION

The present technology pertains to robotics and more specifically to a system and method of providing a robotic retrieval system in a linear slide on a vehicle, such as in a trailer or cargo space, with shelves adjacent to the linear slide such that the robotic retrieval system can place, retrieve, and shuffle items from the shelves as part of a delivery process which can include a human or a drone to deliver items to destination locations. In this scenario, the vehicle does not need to stop as packages are delivered to destination locations.

BACKGROUND

Currently, companies like Amazon or other mail-order merchants deliver packages directly to the homes of consumers. Typically, this process involves loading a delivery truck with packages for a particular area and manually delivering each package. This process can be labor-intensive, time-consuming and expensive. At each stop, the driver needs to stop the vehicle, climb into the cargo area of the truck and locate the package for that destination location. The driver typically will provide good service by leaving a package on the porch or a mailbox or some other convenient location for the customer.

There are many challenges associated with this approach, one of which is time. In today's world, next-day delivery is expected for many products purchased online. Thus, any action that is part of the overall business value chain associated with delivering an ordered package to the destination location has to be efficient. Some of the gathering and loading of the truck might be automated, but the last portion of the delivery process is manual and thus can cause delays. Another problem with this approach is that drivers can become worn out. The manual process of lifting and delivering packages is often done on an urgent basis in long shifts and can cause physical health issues to arise for drivers.

In another aspect, a challenge associated with the delivery of packages is simply the driving of larger vans or trucks through neighborhoods which are filled with homes and children. There is an element of danger in terms of how many delivery trucks travel through normally quiet neighborhoods.

SUMMARY

What is needed in the art is an improved process particularly in the last portion of the overall business value chain associated with package delivery. The new process should be more efficient, more safe for the neighborhood and easier on drivers. This disclosure introduces a new model that solves the problems outlined above. A new vehicle structure includes a storage space that can be part of the van or a trailer and that includes a tote retrieval system or robotic retrieval system that rides or moves along a linear slide down the center axis of the storage space. Shelves can be configured on either side that can store packages. The robotic retrieval system travels up and down the linear slide and receives packages and loads, unloads or shuffles the packages on the shelves. At a delivery location, the robotic retrieval system retrieves the package for that destination and provides it to the driver, another robot, or a drone.

In one aspect, the robotic retrieval system can be used in connection with a human driver such that, at a destination location, the driver does not have to climb into the storage space to manually retrieve the package. The driver could open up a rear door and the robotic retrieval system could have the package for that location ready for the driver to receive.

In another aspect, a drone delivery system could be configured with the vehicle. For example, an opening in a ceiling portion of the storage space can enable a package handling component to be dropped down into the storage space which could then receive a package from the robotic retrieval system. The package handling component can be attached to a drone. The vehicle can include such features as charging stations, a structure to replace a drone battery, and structures to provide for any other needs for one or more drones to be used in connection with the vehicle. In this manner, the vehicle does not have to stop when it is near a destination location. The drone can receive the package and fly over to the destination location and then return to the vehicle, which can be at a new location. The vehicle also doesn't need to travel to the particular destination location but can travel on main roads so that a particular package can be picked up by the drone for a quick delivery while the vehicle continues to move. The ability of the vehicle to continue to move during drop-off or pick-up increases efficiency and package delivery times.

Such an approach solves many of the problems outlined above. The vehicles do not need to drive as much into residential neighborhoods, which is safer. The driver does not have to work as hard to physically deliver the packages. The packages can be delivered more quickly than would otherwise be possible with the manual approach. Additionally, multiple packages could be delivered simultaneously as more than one drone could be configured with the vehicle. Because the drones are making short trips to the destinations location, their battery capacity does not have to be large. This can allow the drone to dedicate most of their power capacity to lifting and carrying the packages.

In another aspect, drones can be used in this regard to retrieve packages from origination locations. Customers might register the package as ready to be picked up at an origination location and a package description can be integrated into a control system which will cause a drone to be deployed from the vehicle as it is in the vicinity of the origination location to retrieve the package and bring it back to the vehicle. The drone can hand the package off to the robotic retrieval system via the opening in the ceiling of the storage space and the robotic retrieval system can store the package on an appropriate shelf for ultimate delivery to a distribution center. In this approach, the robotic retrieval system can also shuffle the packages en route such that a more efficient and quick retrieval and delivery of a package from the robotic retrieval system to a drone can be achieved. For example, as a new neighborhood is approached by the vehicle, the robotic retrieval system can shuffle packages in the storage space to be closer to the opening in the ceiling where the drone receives packages for delivery. For a manual arrangement, the reshuffling can cause the package to be delivered next to be moved to a shelf near the rear of the storage space.

In another aspect, the system could enable a drone to retrieve from the robotic retrieval system two or more packages to be delivered at two or more destination locations relatively close to each other. Thus, one trip for the drone from the vehicle for delivery does not have to be limited to having a single package delivered to a single destination location. The control system can cause the drone to perform multiple operations in a single trip. For example, the drone may, in a single trip, deliver one package of the destination location and then move two houses down to an origination location where the drone picks up a package and then returns to the vehicle.

The various embodiments disclosed herein can include methods, systems, drones, vehicles, robotic retrieval systems, storage spaces for vehicles, charging stations for drones, battery replacement structures, control systems on one or more of the vehicle, a central server configuration, or a distributed approach, and so forth. This disclosure provides a new ecosystem for vehicles to be used to deliver packages in a more efficient manner and any single component (a robot, a drone, a vehicle, a control system, etc.) can be separately considered an embodiment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 1A-E illustrate various view of a robotic retrieval system;

DESCRIPTION OF EXAMPLE EMBODIMENTS

Figure 1E:
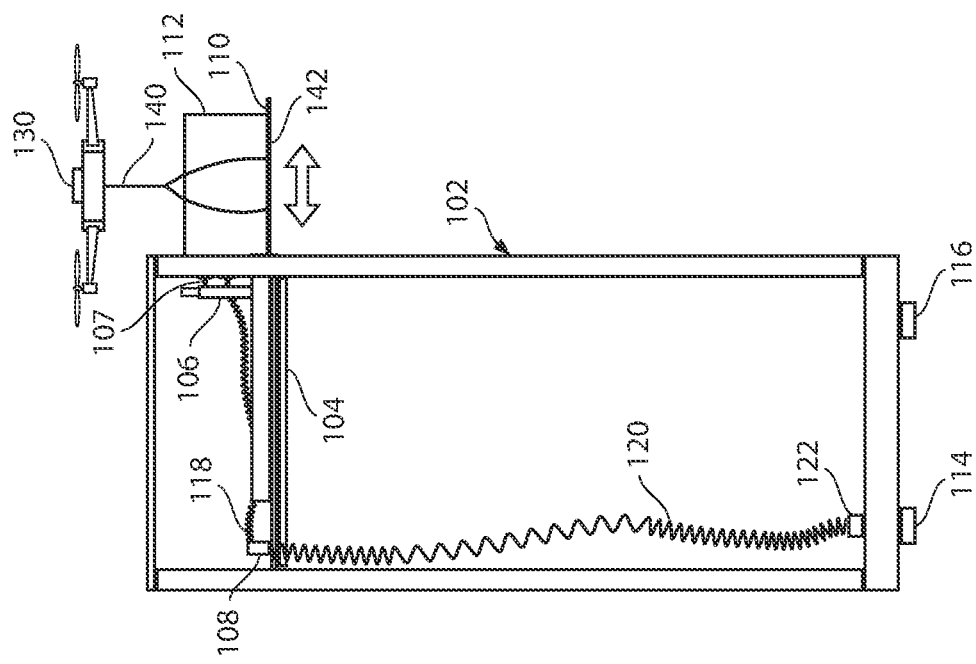

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks including functional blocks comprising devices, device components, steps or routines in a method embodied in software, or combinations of hardware and software.

The following discussion introduces a new vehicle with a number of different structures and configurations which can be used to improve the efficiency and safety of package delivery. FIG. 1A illustrates an example robotic retrieval system 100 or a tote retrieval system. Generally, the robotic retrieval system 100 is used to retrieve and move packages from one location to another such as from a human to a shelf, from one shelf to another shelf, or from a shelf to a drone. The structure shown with respect to the robotic retrieval system 100 is meant to be general in nature. One example robotic retrieval system 100 is shown in the figures. However, as shall be explained herein, the robotic retrieval system 100 can be any robot that is configured to receive packages and to transfer the packages to and from shelves configured in a vehicle as well as to and from a platform or other structure associated with a drone. Thus, while a particular robotic retrieval system 100 is described next, this discussion is not meant to be limiting to the particular robotic structure that is disclosed and this robotic structure is meant to be exemplary. U.S. patent application Ser. No. 16/891,861, filed Jun. 3, 2020, incorporated herein by reference, provides further details regarding the example robotic retrieval system 100. Accordingly, while reference to the tote or robotic retrieval system 100 is provided, other terms can also be utilized such as robot, package manipulation system, and so forth.

FIG. 1A illustrates a number of different components to a robotic retrieval system 100. A framework 102 is provided which enables a platform 104 to be configured in connection with the framework 102. The platform 104 can be configured such that it can rotate to enable a tray 110 to be extended or retracted upon which a package 112 can be placed. In one example, a package retrieval component 106 can utilize suction cups 107 to engage with the package 112. The package retrieval component 106 can be connected via a wire 118 to a control component 108. Another wire 120 can connect the platform 104 to another control mechanism 122.

Rollers 114, 116 can be provided on a lower surface of the frame 102 which can be used in connection with a linear slide introduced later in this disclosure. The position of the platform 104 is shown with the package 112 configured on the tray 110. The state or position shown in FIG. 1A could be where a user or another robot has provided the package 112 to the robotic retrieval system 100 and it is in the process of elevating to a particular height to deposit the package 112 on a shelf (not shown).

In one example embodiment, the package retrieval component 106 and the tray 110 operate as a unit to retrieve and deliver packages. FIG. 1B illustrates a state in which the platform 104 is raised relative to the position shown in FIG. 1A. Assume that the platform 104 is positioned at a desired height which can correspond to a shelf in a storage area of a vehicle. The package retrieval component 106 is moved to the right along with the tray 110. The package 112 can be left on a shelf and the suction cups 107 can cause the package 112 to be released such that the package is not pulled back as the tray 110 moves to the left and back in the position on the platform 104.

FIG. 1C illustrates a top view of the robotic retrieval system 100 with the frame 102 and the platform 104. In this example, the platform 104 is shown having a circular configuration. The platform 104 can rotate a clockwise or counterclockwise to retrieve the package 112 or to deliver the package 112. The package retrieval component 106 is shown with the suction cups 107 which are configured to secure the package 112 for pulling back onto the platform 104 once the package is attached to the suction cups 107.

Figure 1D:
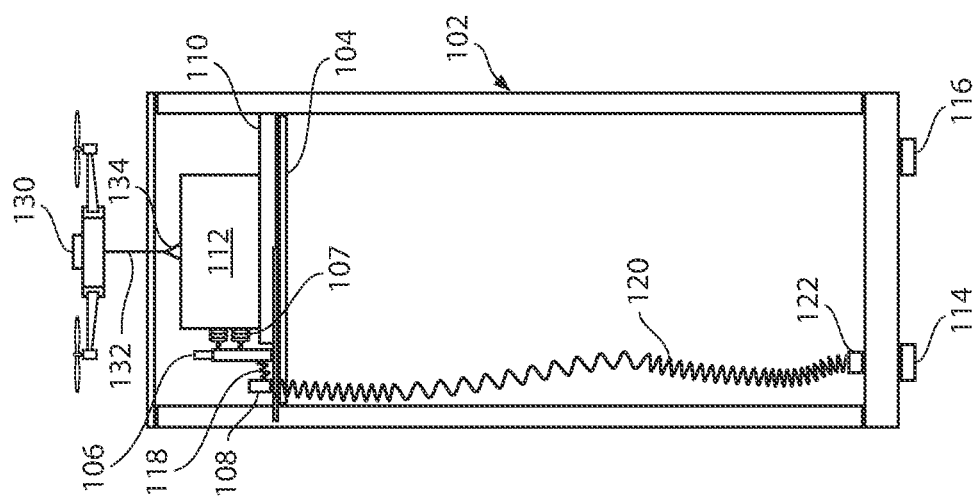

FIG. 1D illustrates an example of the robotic retrieval system 100 in a configuration associated with a drone 130. The robotic retrieval system 100 can elevate the platform 104 to an upper position within the framework 102. When the robotic retrieval system 100 is configured in a vehicle, an opening in a ceiling of a storage space can enable a package attachment component 134 to be lowered via a cable 132 to retrieve the package 112. The drone 130 can then lift the package 112 out of the framework 102 and deliver the package 112 to a destination location. It is noted that the cable 132 and the package attachment component 134 are shown by way of example only. The package attachment component 134 can also be called an item-securing mechanism which is utilized for grabbing or securing the item from the platform. For example, the drone 130 could also lower a drone platform upon which the package 112 can be placed via the use of the tray 110. There is no restriction on the particular structure or mechanism by which the drone would reach down and retrieve the package 112 from the robotic retrieval system 100. For example, the drawer may utilize a claw or a magnet or some other mechanism which can be used to retrieve the package 112 for delivery.

FIG. 1E illustrates an example configuration in which the drone 130 utilizes a drone platform 142 that is lower down via a cable 140 to retrieve the package 112. In this case, the platform 104 is raised to an upper portion of the framework 102 to be near an upper portion of the storage space and closer to the drone 130. The tray 110 extends to the right with the package retrieval component 106 such that the package 112 is moved on to the drone platform 142. The suction cups 107 can release the package 112 such that when the tray 110 returns to the left to be positioned over the platform 104, the package 112 stays on the drone platform 142.

In another aspect, the platform 104 does not necessarily have to elevate to an upper portion of the framework 102. For example, the drone 130 could lower down to whatever level the platform 104 is at in order to retrieve the package 112.

Figure 2:
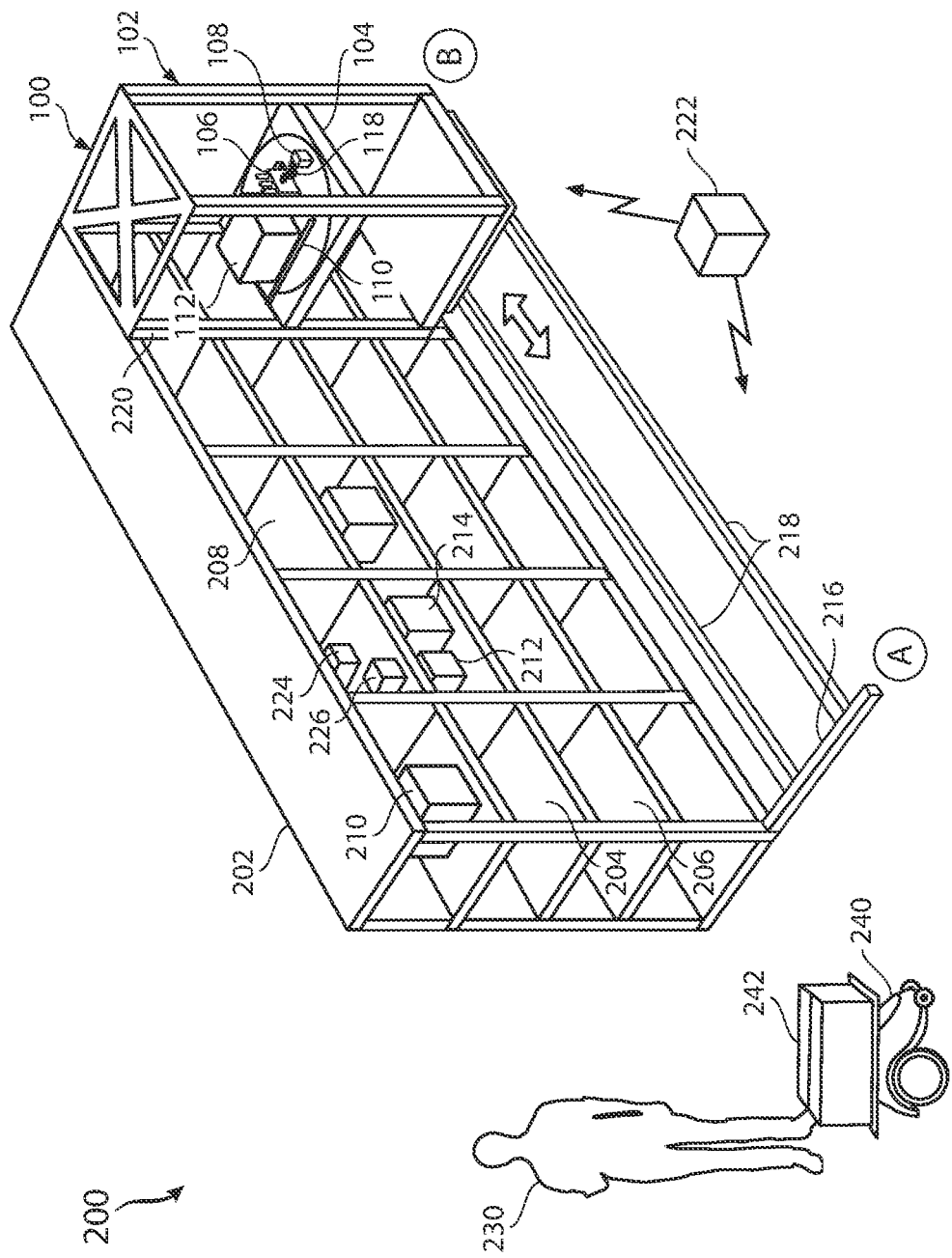
FIG. 2 illustrates a cut-away view of a storage space associated with a vehicle.

FIG. 2 illustrates a cut away view of a storage space 200 which can correspond to a van, trailer, or other portion of any vehicle which can be applicable to the present disclosure. The vehicles that can apply also can extend to trains, planes, helicopters, or any other vehicle that can utilize a storage space for managing packages that are to be delivered to destination locations. The most common application of the present disclosure will be for a delivery van such as is used by United Postal Service, Federal Express, Amazon Prime and the like. However, as noted above, the principles described herein can apply to any vehicle and is not limited to this more common use. Self-driving vehicles can also be utilized as well.

The storage space 200 includes shelves 202 configured adjacent to a linear slide 218 positioned on a floor 216 of the storage space 200. The robotic retrieval system 100 utilizes its rollers 114, 116 to slide along the linear slide 218 or tracks. The use of the linear slide 218 is provided by way of example. The robotic retrieval system/robot 100 could also simply move along a floor 216 of the storage space 200 on wheels, tracks, or any other mechanism. In one embodiment, the robotic retrieval system 100 moves forward or backward in a linear fashion and retrieves packages 112 from either a person 230 or a mobile robot 240 that provides packages 242 to the robotic retrieval system 100. In operation, the robotic retrieval system 100 will load the shelves 202 by moving to position A and retrieving one or more packages for loading. Position A can be at the end of the storage space 200 such as at the back of a trailer or a van. A door can open and one or more packages can be loaded onto the robotic retrieval system 100. Different shelves 204, 206, 208 are shown as well as packages 210, 212, 214 already positioned on the shelves. The robotic retrieval system 100 can move between position A and position B and can thereby retrieve packages for loading into the various shelves 202.

While the robotic retrieval system 100 can move between position A and position B is described as moving in a linear direction in the storage space 200, the structure can also be different. For example, the robotic retrieval system 100 may also move in a non-linear fashion. For example, the shapes of the shelves 202 might be such that an isle down the middle curves or is not consistent in its width. The robotic retrieval system 100 may move freely in the space adjacent to a respective shelf 202.

In order to coordinate the loading of packages, a central control system 222 can be provided. The central control system 222 can be configured in a warehouse or in any location including at least in part on a vehicle. The type of information that is managed by the central control system 222 can include package routing instructions and can take into account a number of different factors. For example, the central control system 222 can utilize information about each respective package that is to be delivered to a certain destination. The geographic location of each package, the size of the package, the weight of the package, the contents of each package, a priority associated with each package, and so forth can be utilized as parameters in determining an order to load the shelves 202 as well as a position on a respective shelf. For example, if the warehouse has 100 packages to deliver to a particular area, the central control system 222 can determine a route for the vehicle to take and can cause a human 230 or a mobile robot 240 to provide the 100 packages in a certain order to the robotic retrieval system 100 in the storage space 200. The respective packages can be loaded into proper shelves 202 which can be strategically loaded such that the retrieval of each respective package can be strategic in terms of efficiency. For example, if a drone or robot is involved in the final delivery of the respective package to a destination location, packages that are to be delivered first can be loaded in shelves 204, 206 which are near the back of the storage space 200 and easily retrieved by the robotic retrieval system 100 and provided to the delivery person, drone or robot. In another aspect, a combination of some drone delivery for lighter packages and manual delivery for heavier packages can be part of one delivery trip. Thus, heavier packages can be positioned at the back of the storage space 200 and say shelves 204, 206 and lighter packages might be stored in shelves 220 which can easily be retrieved and provided to a drone 130 as shown in FIG. 1E.

Thus, the central control system 222 can manage a number of different phases of package movement. The first can be the initial loading of the shelves 202 and the order in which packages are provided at point A to the robotic retrieval system 100. A second phase can involve how packages are manipulated or moved during the delivery route or while a vehicle is moving. For example, at a first stop at a destination location, a group of packages might be delivered by a person 230 to the destination location. While in route to a second destination location, the robotic retrieval system 100 might reshuffle the packages such that a new set of packages has been moved from a higher shelf or an interior shelf such as shelf 208 to shelves 204, 206 such that they can easily be retrieved from the shelf and not have to travel very far to be retrieved by the person 230. Of course, at the delivery or destination location a mobile robot 240 can also be provided for retrieving the package from the vehicle.

In another phase, the robotic retrieval system 100 might reshuffle packages in order to better position then for quick and easy delivery to the drone 130 or to a person 230. These various movements of the packages can be mapped out in advance by the central control system 222 such that instructions might be provided to one or more other robots or components within the system in order to move the packages to the proper positioning in preparation for final delivery. In some cases, loading packages on the respective shelves 202 and/or providing respective packages to a drone 130, a person 230, or a mobile robot 240, can be fixed in advance and simply carried out for a particular delivery route as part of a route protocol. In another example, the package manipulation program or protocol might be dynamic and might adjust based on changing circumstances. For example, a package delivery route might change in the middle of the route depending on traffic or how long it takes a drone to deliver one or more packages. Thus, one aspect of this disclosure might be determining initial expected travel route and package manipulation protocol for that travel route. As information is received during the carrying out of the travel route, adjustments might be made by the control system in terms of one or more parameters or changes that need to be made. For example, packages that were originally intended to be delivered by human 230 might be altered to be delivered by the drone 130. Packages might be picked up by the drone 130 or by a person 230 at an origination location which were not expected. The route traveled by the vehicle might be adjusted based on one or more of weather, package size or characteristics, a battery power or drone type, a package priority, the fact that a package needs to be picked up that was not known in advance, a package priority, and so forth. Thus, the processing of additional packages as part of a delivery route might cause a change in the package shuffling protocol. In one example, a large package might be unexpectedly retrieved from a destination location and room might need to be made on one or more shelves for such a package. Such adjustments can be managed by the central control system 222 or a localized control system on the vehicle.

For example, if during a delivery trip a package is picked up by a person 230, the system might receive information about the package (size, weight, etc.) and while the person 230 is picking up in the package and getting ready to load the package into the vehicle (by handing it to the robotic retrieval system 100 or otherwise, the robotic retrieval system 100 may move other packages to make room for the retrieved package on a convenient shelf for the person 230.

In another aspect, the robotic retrieval system 100 might receive information or coordinate information about the route of a vehicle such that reshuffling occurs at safe times. For example, reshuffling could occur during vehicle stops, or an instruction might be provided to the driver to stop or avoid turning while reshuffling occurs such that packages don't fall or get misplaced due to vehicle movement.

FIG. 2 illustrates a set of shelves 202 configured adjacent to the linear slide 218. In this cutaway image, it should be understood that another set of shelves is not shown and which could be on the right side of the linear slide 218.

Also note that on shelf 228 the first package 224 is configured to be deeper in the shelf than package 226. One aspect of this disclosure is the ability of the system to not only place a package on the shelf but to utilize a two or three-deep configuration in which the depth of the respective package is determined and tracked by the central control system 222. Thus, part of the package manipulation protocol could include whether a particular package is positioned in a first position or a second deeper position within a respective shelf. The central control system 222 will track package positions on respective shelves in this manner.

Figure 3:
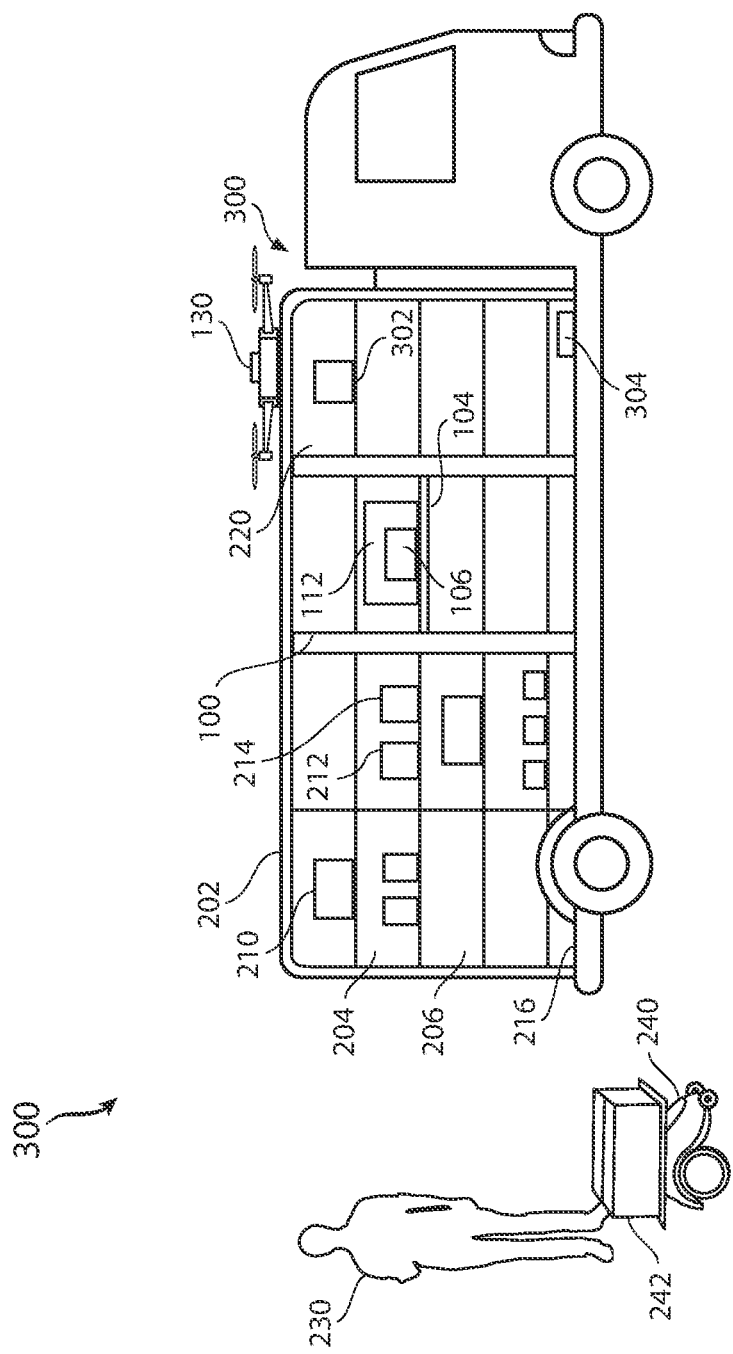
FIG. 3 illustrates a cut-away view of the storage space associated with a vehicle.

FIG. 3 illustrates a cutaway view of a vehicle 300 with the shelves 202 and packages 210, 212, 214, 302 on various selves 204, 206, 220. The robotic retrieval system 100 is shown with a package 112 on the package retrieval system 106. The drone 130 is shown on the roof of the vehicle. A control system 304 (which can be similar to control system 222) can be configured on the vehicle 300 or elsewhere. The control system 304 can also be distributed amongst different nodes as well. The person 230 or a robot 240 can deliver packages 242 to the vehicle 300 for loading. The robotic retrieval system 100 moves in a linear fashion along a floor 216 of the vehicle along tracks 218 (not shown).

Figure 4:
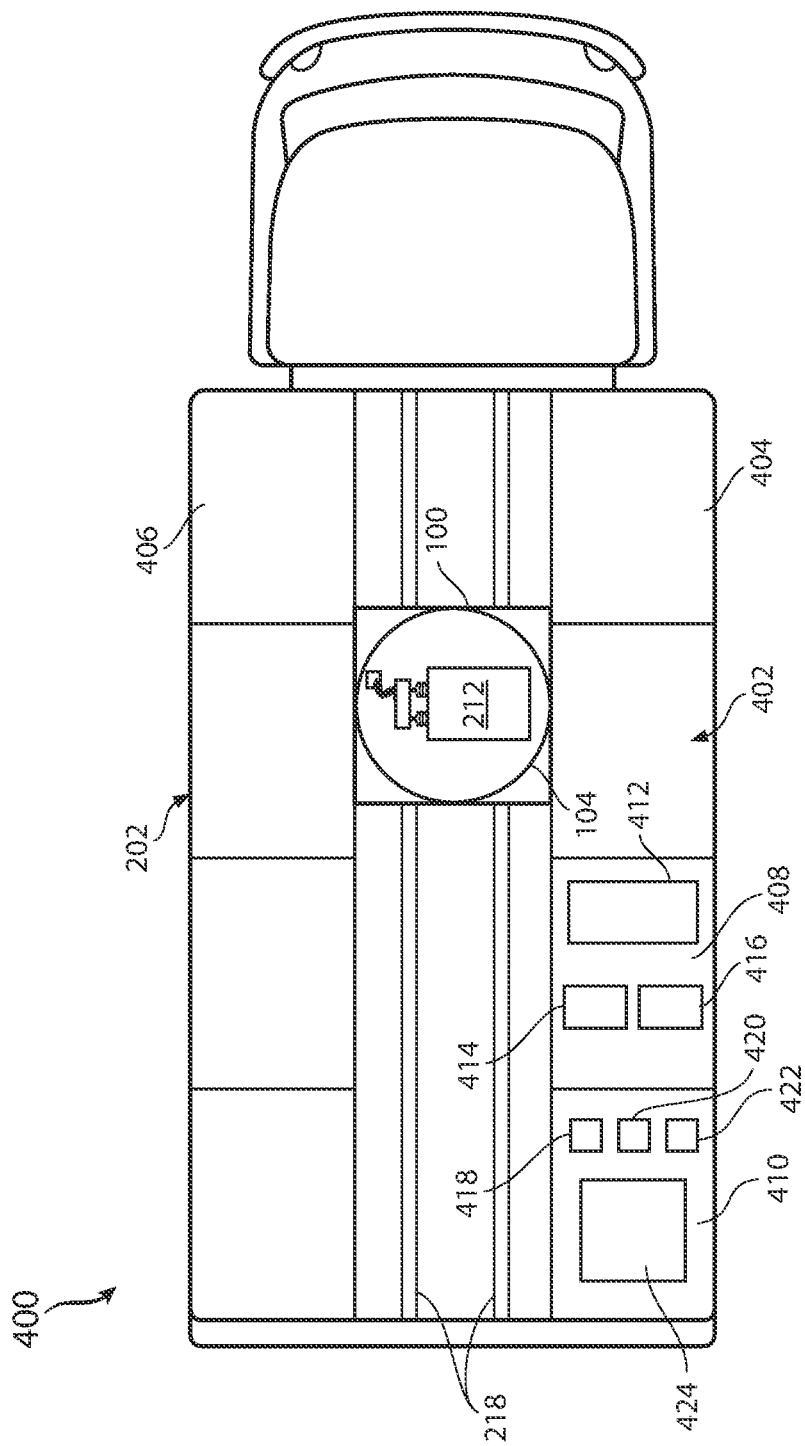
FIG. 4 illustrates a cut-away top view of the storage space and the robotic retrieval system.

FIG. 4 illustrates a top view of the vehicle 400. The roof of the vehicle 400 is removed such that shelves 202 are shown with a shelf 406 on one side of the linear track 218 and shelves 410, 408, 404 as part of a second set of shelves 402 on the right side of the linear track 218. A top view of the robotic retrieval system 100 is shown as well. This view illustrates the positioning of packages such that the shelf 410 can include a large package 424 and three smaller packages 418, 420, 422. These three packages are positioned three-deep on the shelf 410. The robotic retrieval system 100 can position packages one-deep, two-deep, or three-deep and the control system will retain a record of the level or position at which a package is placed on a shelf for later retrieval or reshuffling. Shelf 408 includes a package 414 and another package 416 that are positioned two-deep and a larger package 412. These and other configurations can be provided with respect to the positioning of packages on a respective shelf. More packages can be provided on a respective shelf at respective depths as well.

Figure 5A:
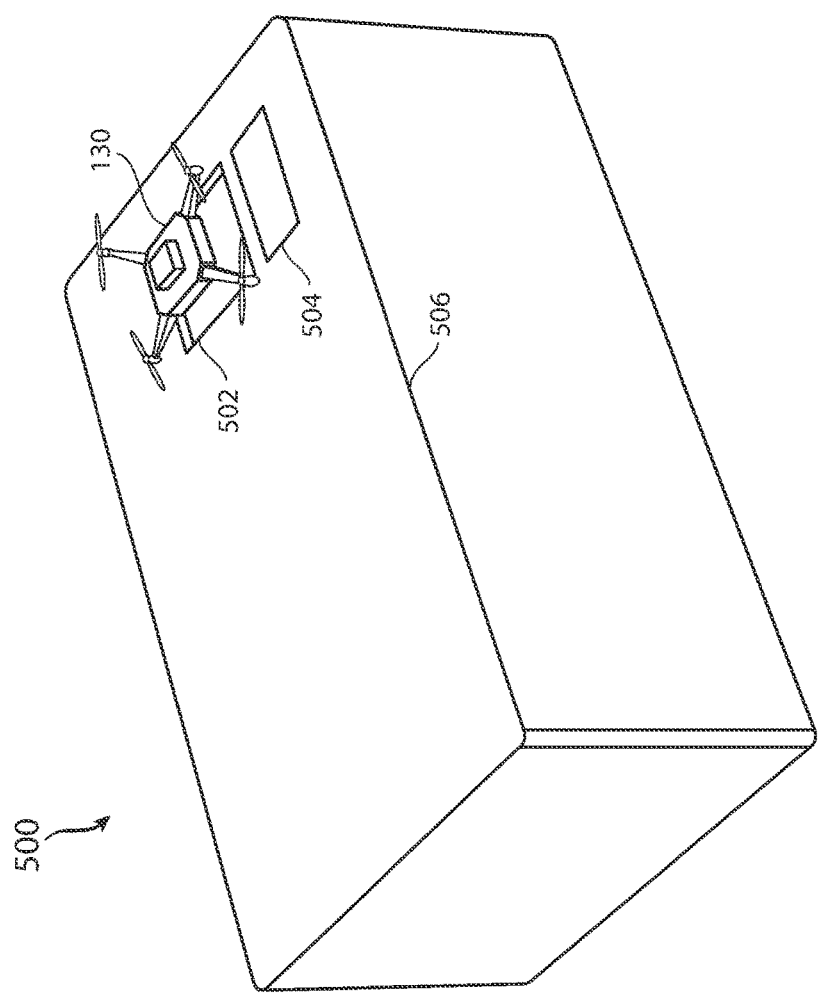
FIGS. 5A-E illustrate various views of the storage space with an opening in the ceiling 8 and some use of drones.

FIG. 5A illustrates an example storage container 500 which can be configured as part of the vehicle (not shown). A roof 506 can include an opening 502 which can be configured such that a drone 130 can be positioned over the opening 502. This figure generally illustrates how the drone 130 can land on the roof 506 and be provided access to the interior of the storage container 500 such that packages can be passed or retrieved from a shelf (both manually or via the robot 100) and provided to a drone 130. Feature 504 can represent a number of different components associated with charging the drone 130. For example, a charging station can be represented by feature 504 which can be used as the drone 130 is configured or positioned on the roof 506 to charge batteries of the drone 130. Feature 504 can also represent a battery exchange component which can swap out the battery of the drone 130 for a fully-charged battery or a battery of the different size or capacity for handling one or more trips to deliver packages.

As noted above, the robot retrieval system 100 could also be replaced by a human. A person can be provided with instructions by the control system for moving packages around the various shelves and retrieving packages and providing them to the drone 130.

Figure 5B:
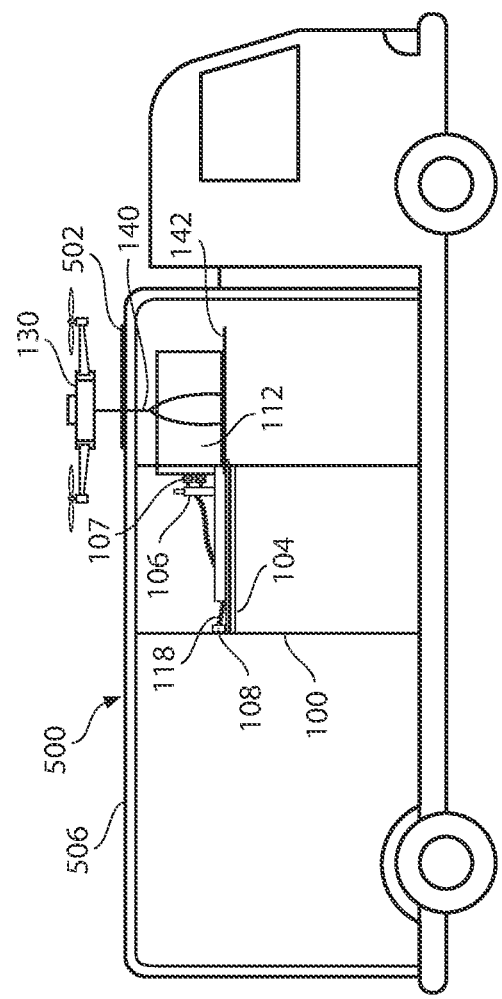

FIG. 5B illustrates a vehicle having the storage container 500 having a roof 506 upon which the drone 130 can sit. This cutaway of the storage container 500 shows the robotic retrieval system 100 with its various components. Package 112 is shown with the tray 142 of the drone 130 receiving the package 112 from the robotic retrieval system 100 in an extended position such that the package 112 is positioned under the opening 502 in the roof 506 of the storage container 500. A cable 140 is shown to be used to retrieve the package 112 for the drone 130 such that the drone 130 can lift the package 112 out of the storage container 500 for delivery to a destination location. This figure illustrates an example state or configuration of the robotic retrieval system 100 relative to the opening 502 such that the drone 130 could lower down a cable 140 or some other retrieval device and retrieve the package 112 for delivery.

Figure 5C:
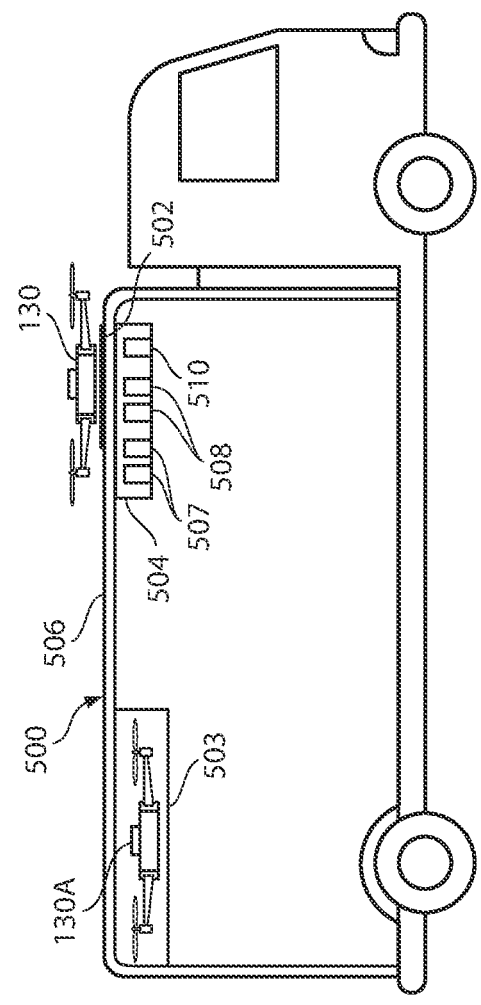

FIG. 5C illustrates a storage container 500 having the roof 506 with the drone 130 configured thereon. The opening 502 is represented as well as a power component 504. The power component 504 represents a number of different possible structures which can relate to charging the drone 130 or replacing a battery of the drone 130. For example, the power component 504 can store a first type of battery 507, a second type of battery 508 and a third type of battery 510. Depending on the needs of the drone 130 for a particular trip, a current battery on the drone can be swapped out for a respective type of battery which can match or be configured for one or more of a size of the package, a weight of the package, a delivery distance, a priority of the package, a configuration of a trip to deliver the package, weather conditions, a configuration of the terrain associated with a trip, and so forth. The drone 130 can have a battery that is charged via the power component 504. A timing of how long it takes to charge a battery can also be taken into account by the control system 222.

In one aspect, a truck 500 might be tall and it may be less desirable to configure the drone 130 on a top of the roof 506. Thus, an alternate structure is to store the drone 130A as shown in FIG. 5C in a compartment 503 within the back of the truck 500 and below the roof 506. An opening in the back or side of the truck 500 can enable the drone 130A to fly sideways and out. All of the charging and other accessories shown can be provided to compartment 503 for charging, battery exchange and so forth. All functionality provided to drone 130 can be provided to the compartment 503 for servicing the drone 130A. A truck 500 can also include both a compartment 503 for storing the drone below the roof 506 as well as the structures on the roof 506 to drone 130 and the drone 130 can move to the compartment if a low bridge or tree might impact the drone either through data obtained from sensors or from mapping data.

Loading the drone 130A can also occur from the compartment 503 such that the drone could move into the interior of the truck 500 and obtain packages and then go out an opening on the side of the truck rather than out the top 506. All the functionality and structure that is provided for drones 130 to move in and out of a top opening in the truck 500 can also exist for a side opening in connection with a compartment 503 or a separate side opening.

Figure 5D:
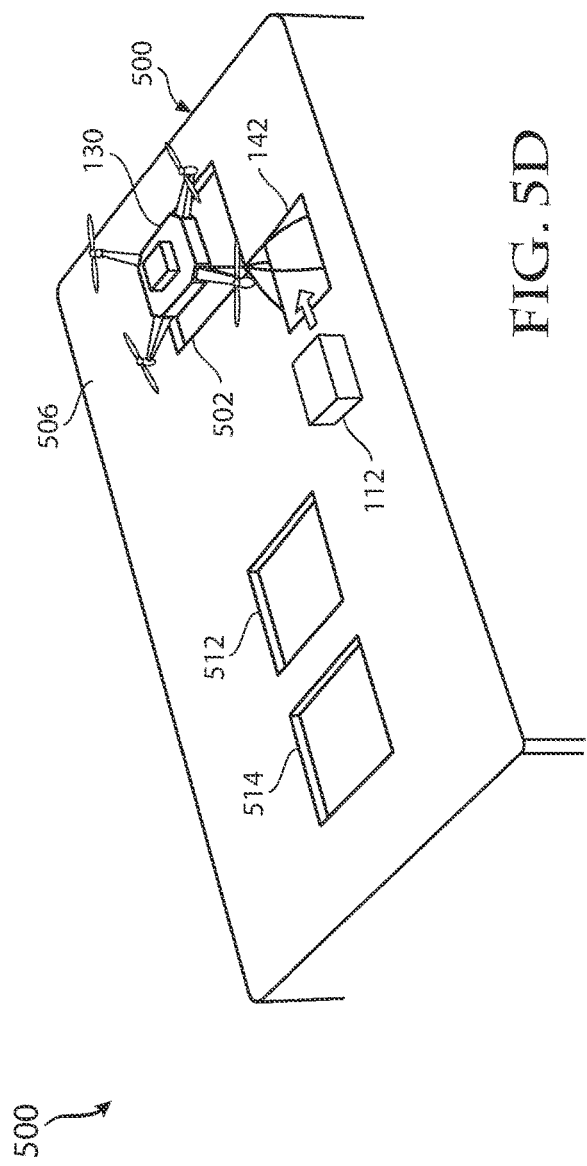
Figure 5E:
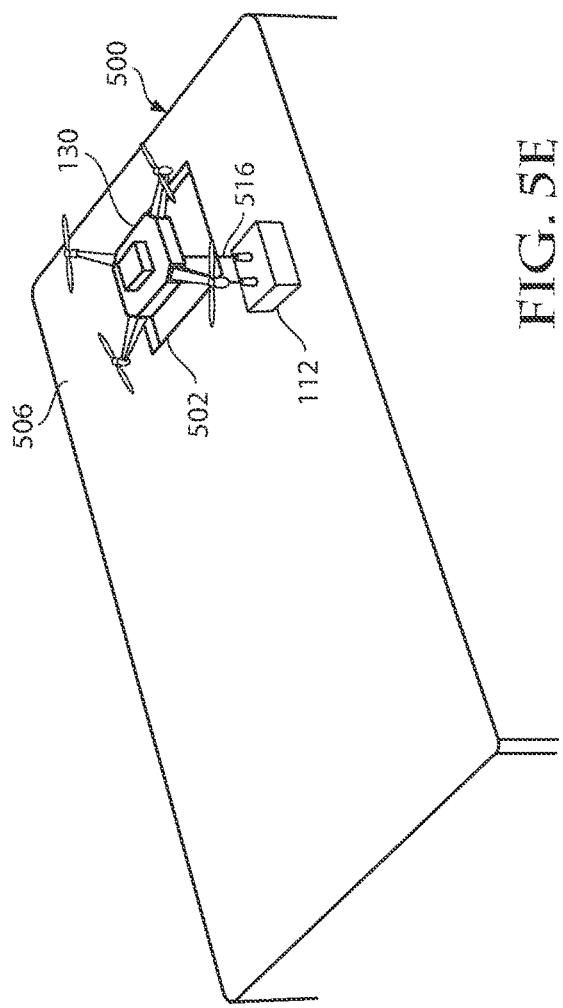

FIG. 5D illustrates the roof 506 of the source container 500 having additional openings 512, 514. In this figure, the drone 130 might be positioned over one of a plurality of different openings in the roof 506 to retrieve the package 112. The control system 304 which manages the instructions provided to the drone 130 as well as the robotic retrieval system 100 can coordinate the respective opening the drone 130 uses to retrieve the package 112. In FIG. 5D, the package 112 is retrieved on a platform 142 by the drone 130. FIG. 5E illustrates a different attachment mechanism 516 which can include suction cups that attach the package 112 to the drone 130. Any type of package retrieval system can be used by the drone 130. For example, a net, a claw or another device to grasp the package can be used. Any other type of mechanism can be used to retrieve and hold the package by the drone 130 for use in delivery.

Figure 6:
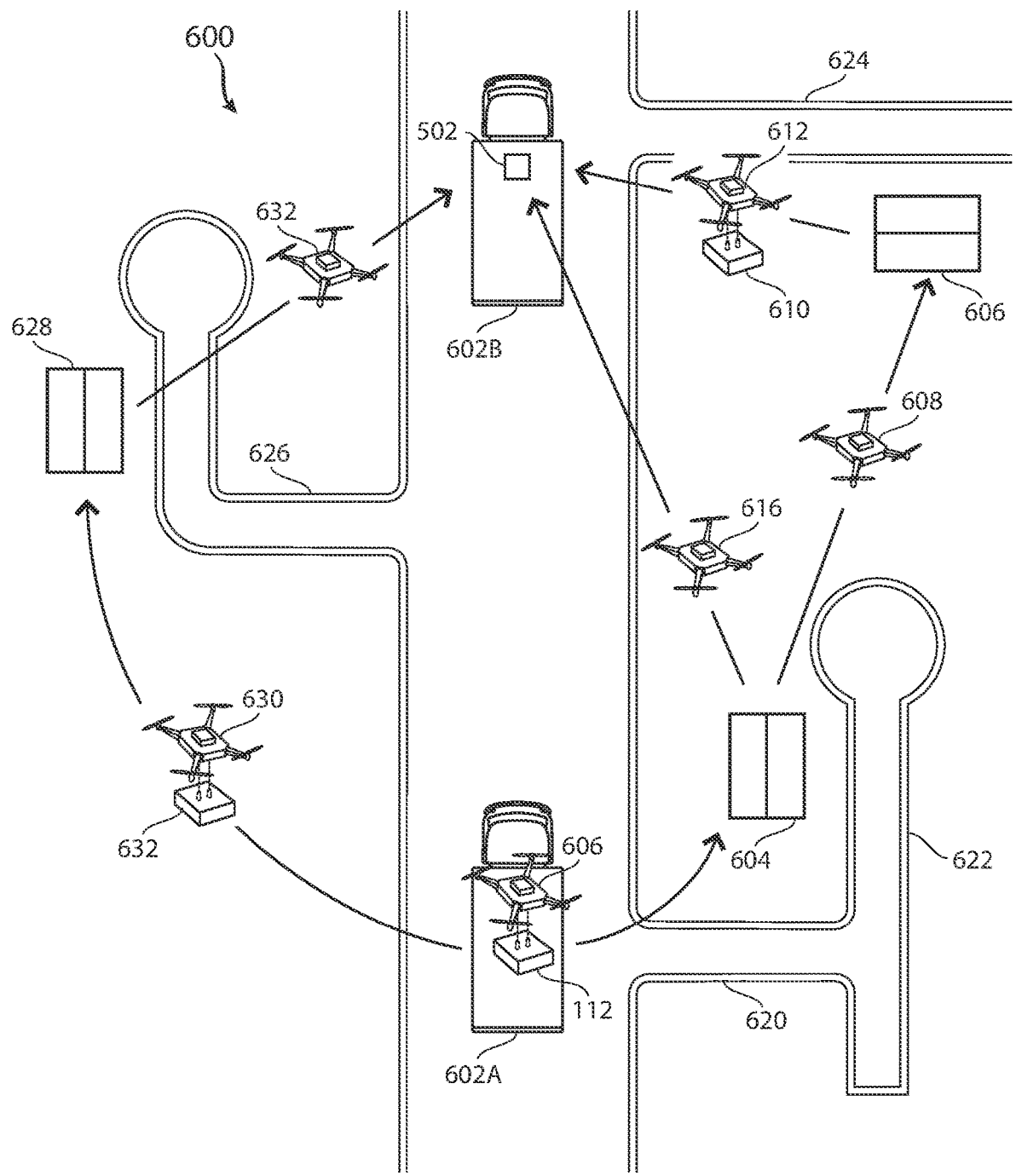
FIG. 6 illustrates a top view of a vehicle and one or more drones delivering packages to delivery locations along a road.

FIG. 6 illustrates a package delivery approach 600 in which a vehicle 602A it is at a first position and a drone 606 is configured on a roof of the vehicle and has a package 112 for delivery. In one example, the drone 606 can deliver the package to a destination 604. After delivering the package to the destination 604, the drone 616 may return to the vehicle 602B at a new location as the vehicle does not stop moving. In another example, after dropping off the package 112 at the destination 604, the drone 608 is instructed to pick up a package 610 at a pickup location 606. The drone 612 then would return with the package 610 to the vehicle 602B. Note that vehicle 602A and 602B represent the same vehicle but at different locations. In another aspect, FIG. 6 can represent two different vehicles operating in a coordinated fashion such that the drone takes off from a first vehicle and returns to a second vehicle. For example, one vehicle can be used for delivery of packages and another vehicle might receive packages picked up on a route.

Note that global positioning systems or any location service can be deployed on one or more of a vehicle and a drone or other robot such that as the vehicle moves, the drone can be provided with updated coordinates as to the location of the vehicle. Wireless communication systems can coordinate new locations with the various nodes of the system to enable travel to and from a respective vehicle. Other technical components such as cameras, artificial intelligence algorithms, microphones, speed sensing devices, LiDAR systems, wind sensors, weather sensors, and so forth can be deployed on vehicles and/or drones to enable the drone 130 or other robots to leave a vehicle and return to the same or different vehicle as directed by the control system 304/222. Such systems can aid in vehicle identification, docking procedures, speed analysis, weather analysis and so forth.

In another example, the same or a different drone 630 might deliver a package 632 to a destination location 628 and then the drone 632 can return to the vehicle 602B at the new location. FIG. 6 can also represent multiple drones in operation with a vehicle such that one drone delivers packages on the right side of the street and a second drone delivers packages on the left side of the street. FIG. 6 generally represents an example approach in which the vehicle continuously moves and one or more drones are programmed to retrieve packages from the vehicle and deliver packages and/or pickup new packages and then return to the vehicle at the new location. The process in FIG. 6 could also be represented by the vehicle stopping at one location while the drones carry out respective trips and assignments and return back to the vehicle at the same location. As noted above, two vehicles could also be used in which drones take off from one vehicle and return to a second vehicle. For example, a route could have fifty package deliveries and ten packages to pick up. A separate truck could be deployed to receive the picked up packages such that the second truck could return to a distribution center once the ten packages are loaded, and the drones could then return to the first truck to continue to aid in delivering the remaining packages. Such configurations can be part of a package delivery protocol which can include different numbers of trucks, drones, robots, and routes for efficiency using the components disclosed herein.

Figure 7:
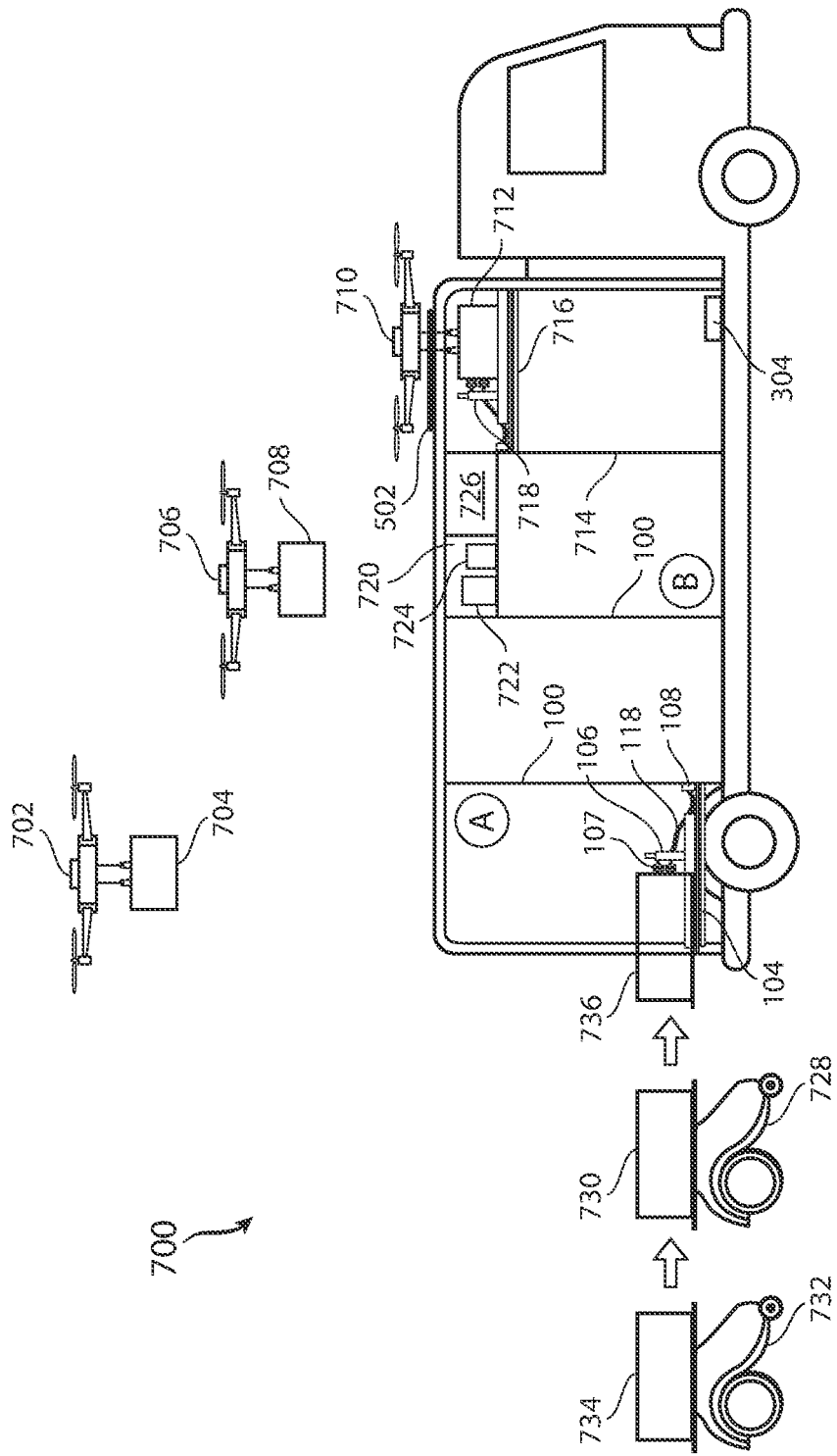
FIG. 7 illustrates a cut away view of the robotic retrieval system in the storage space of the vehicle with the drone or drones receiving and delivering packages.

FIG. 7 illustrates an example loading procedure 700 for a storage container. In one example, robots 728, 732 deliver packages 730, 734, 736 to the robotic retrieval system 100 at a position A at a rear location of the vehicle. Thus, some packages can be delivered via the door in the rear of the vehicle for positioning on the shelves. In another example, a drone 702 can deliver a package 704 to the vehicle via the opening 502. Another drone 706 can deliver a package 708 and another drone 710 can deliver a package 712 via the opening 502. The robotic retrieval system 100 at position B can retrieve these packages and place them on a respective shelf. Shelves 726, 720 are illustrated with packages 722, 724 configured thereon. Thus, using the drones 702, 706, 710 as well as the other robots, the vehicle can be loaded quickly or more quickly than otherwise would be possible if packages are only loaded through a rear door of the storage space.

In another aspect, robot 728 or 730 could represent a robot that is brought along with the vehicle to deliver the package to the destination location. Thus, at a vehicle stop, a robot 728 could be deployed from a storage location on the vehicle, and could then retrieve a package 712 from the robotic retrieval system 100 and deliver the package to the destination location and return to the vehicle. Note that the control system could include an approach in which the terrain at a destination location is considered and the control system assigns either a drone or a robot to receive a package from the robotic retrieval system 100 for final delivery at the destination location. A camera, satellite view, or any other device can be used by the system to evaluate the terrain over which a robot 728 or a drone 130 will travel to deliver a package. An overall delivery protocol for a route can include some assignments to a robot 728 and some assignments to the drone 130 for delivering all the packages in the vehicle.

In one example, the robotic retrieval system 100 at position A can be the same robotic retrieval system 100 at position B such that the same robotic retrieval system 100 can retrieve and store packages both from the rear of the vehicle and from the opening 502 and the roof of the container. In another aspect, these can be two separate robotic retrieval systems for more speedy loading of the vehicle. In one aspect, if there are two robotic retrieval systems configured in the vehicle, they can pass packages to each other from one side of the vehicle to the other as needed. In another example, a temporary robotic retrieval system 100 might be loaded onto the vehicle at position A for just the loading process. The temporary robotic retrieval system 100 could then be removed for the delivery phase.

Figure 8A:
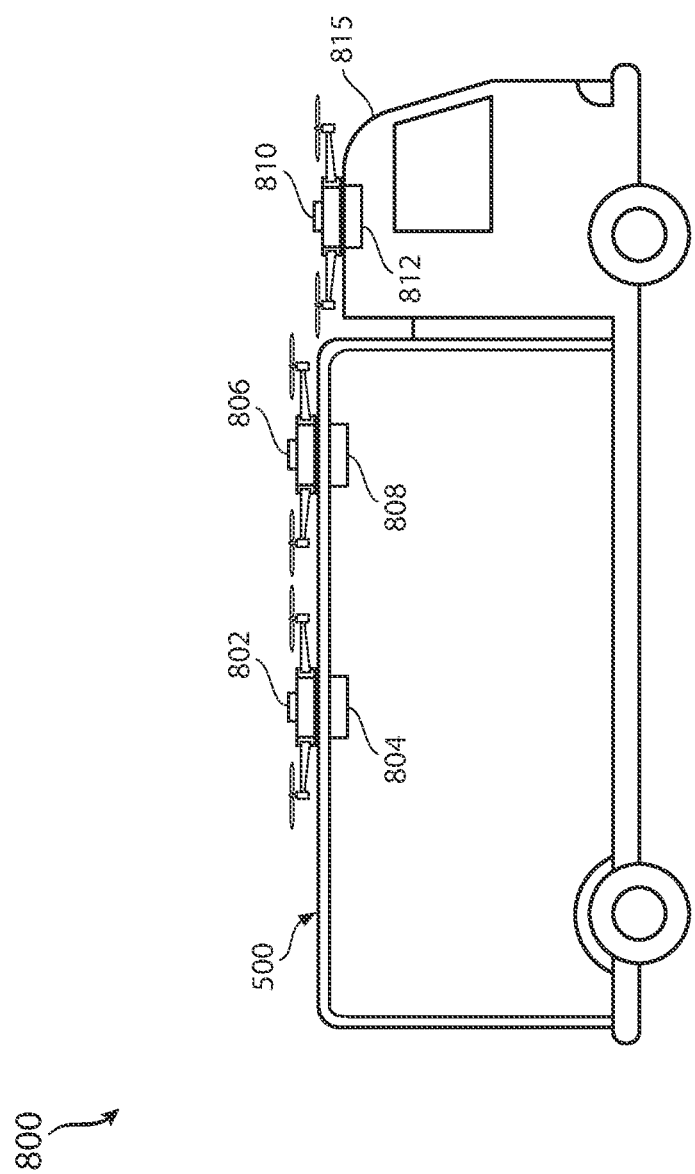
FIGS. 8A-B illustrate various charging and power stations associated with the drones.

FIG. 8A illustrates an example of a vehicle 800 that supports numerous drones 802, 806, 810. A drone can have a respective power component 804, 808, 812. Note that in one instance, the drone 810 can be configured on the cab 815 of the vehicle rather than on top of the storage container 500. FIG. 8A illustrates a configuration in which multiple drones can be simultaneously supported with their power whether batteries have to be charged or replaced at respective power components 804, 808, 812. Three drones are shown by way of example but the number can be two or more. The drone can also be of different shapes and different sizes which can be tailored for different sizes/weights of packages, different delivery trip distances, different battery pack sizes, and so forth.

Figure 8B:
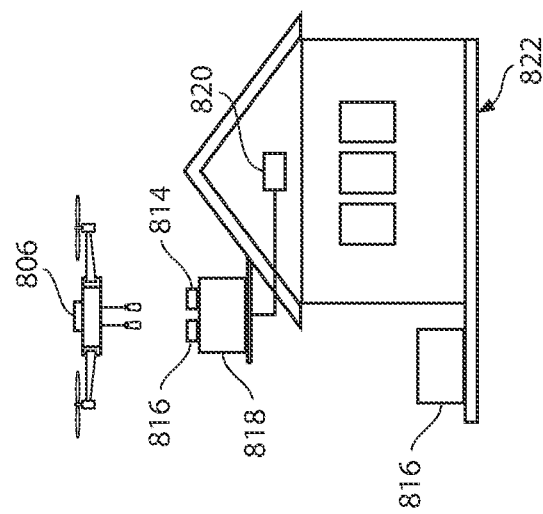
Figure 8B:
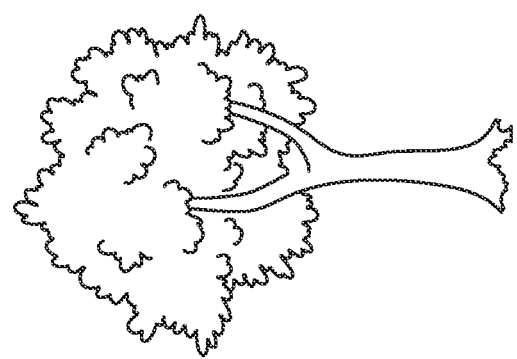
Figure 8B:
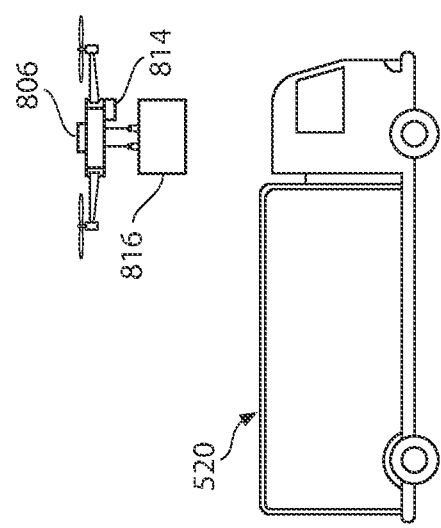

FIG. 8B as another example of vehicle 520 having a drone 806 with the package 816 for delivery to a destination 822. The drone 806 includes a battery 814. The destination location 822 includes a power component 818 which can enable the drone to drop off its battery 814 and retrieve the new charged battery 816. A power source 820 can be provided for the destination location 822. Thus, the process can enable the drone 806 to drop off the package 816 and then at the destination location 822 replace the old battery 814 with a new battery 816 for the return trip. It is also noted that the power component 818 can also represent a charging station which, if time permits, the drone 806 can charge batteries prior to returning to the vehicle 520. In this regard, the movement of the vehicle 520 can be coordinated with the control system 304 such that the vehicle may stop, slow down, or may maintain the same pace or route such that the drone 806 can still have its batteries charged and then be capable of returning to the vehicle 520. The drone 806 may get its batteries charged and then return to the vehicle 520 on its way back to the distribution center or the next day as well. The protocol can extend beyond one trip. For example, the drone 806 may charge overnight and return to the vehicle the next day to help in the deliveries that day. The timing of a charge at the destination location can also be taken into account with respect to whether the drone 806 swaps out a battery or charges its battery at the destination location 822.

In one example, a neighborhood, business, town or any other entity could have a drone configured or used by that entity or community. The delivery truck could leave a distribution center to deliver packages to that community. Once the delivery truck gets close, the drone, which can be stationed or configured within the community, can take off and meet the truck to start receiving packages and deliver the packages to that community. When the packages are delivered, the drone could return to that community. As the vehicle moves to the next community, a new drone for that community could depart from a holding position at the community (or elsewhere) and meet the truck to start delivering packages for the second community. In other words, the drones do not have to be "assigned" or tied to the vehicle in this disclosure.

Figure 9A:
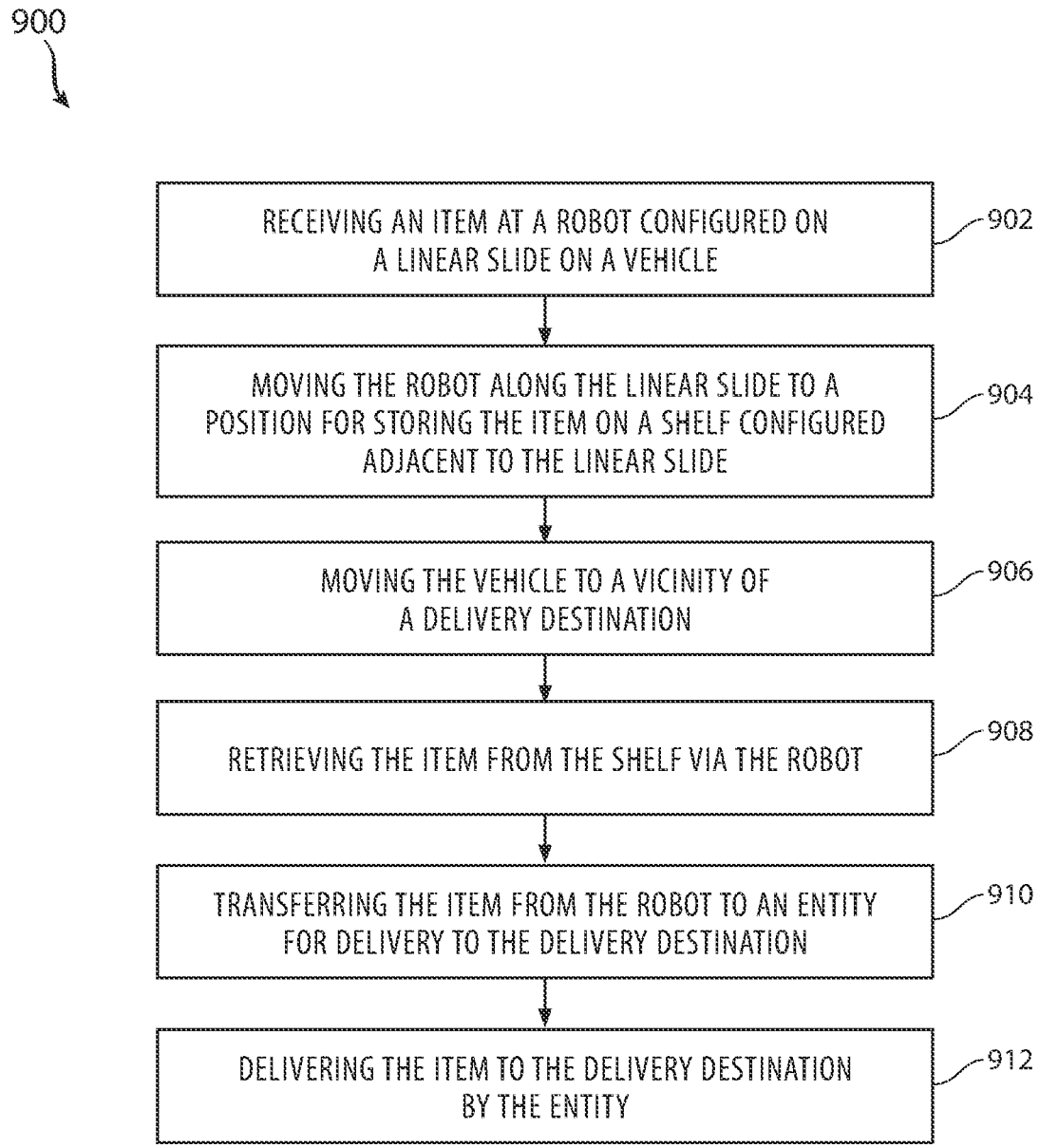
FIGS. 9A-9B illustrate various method embodiments.

FIG. 9A illustrates an example method embodiment. This method pertains to the general use of the robot configured on a linear slide in a vehicle and how that linear slide is used to receive, store and transfer items for delivery. A method 900 includes receiving an item at a robot configured on a linear slide on a vehicle (902), moving the robot along the linear slide to a position for storing the item on a shelf configured adjacent to the linear slide (904), moving the vehicle to a vicinity of a delivery destination (906), retrieving the item from the shelf via the robot (908) and transferring the item from the robot to an entity for delivery to the delivery destination (910). The entity can be one of a person or a drone. The method can include delivering the item to the delivery destination by the entity (912).

In one aspect, when the entity is a drone, the vehicle does not stop when transferring the item from the robot to the drone and delivering the item to the delivery destination by the drone. The system can be used to track each individual item, its position on the shelf and whether it is placed on a left shelf or a right shelf relative to the linear slide and on the vehicle. The system can also track whether the item is placed in a first depth or a second depth (or additional depths or positions) on a respective shelf.

Figure 9B:
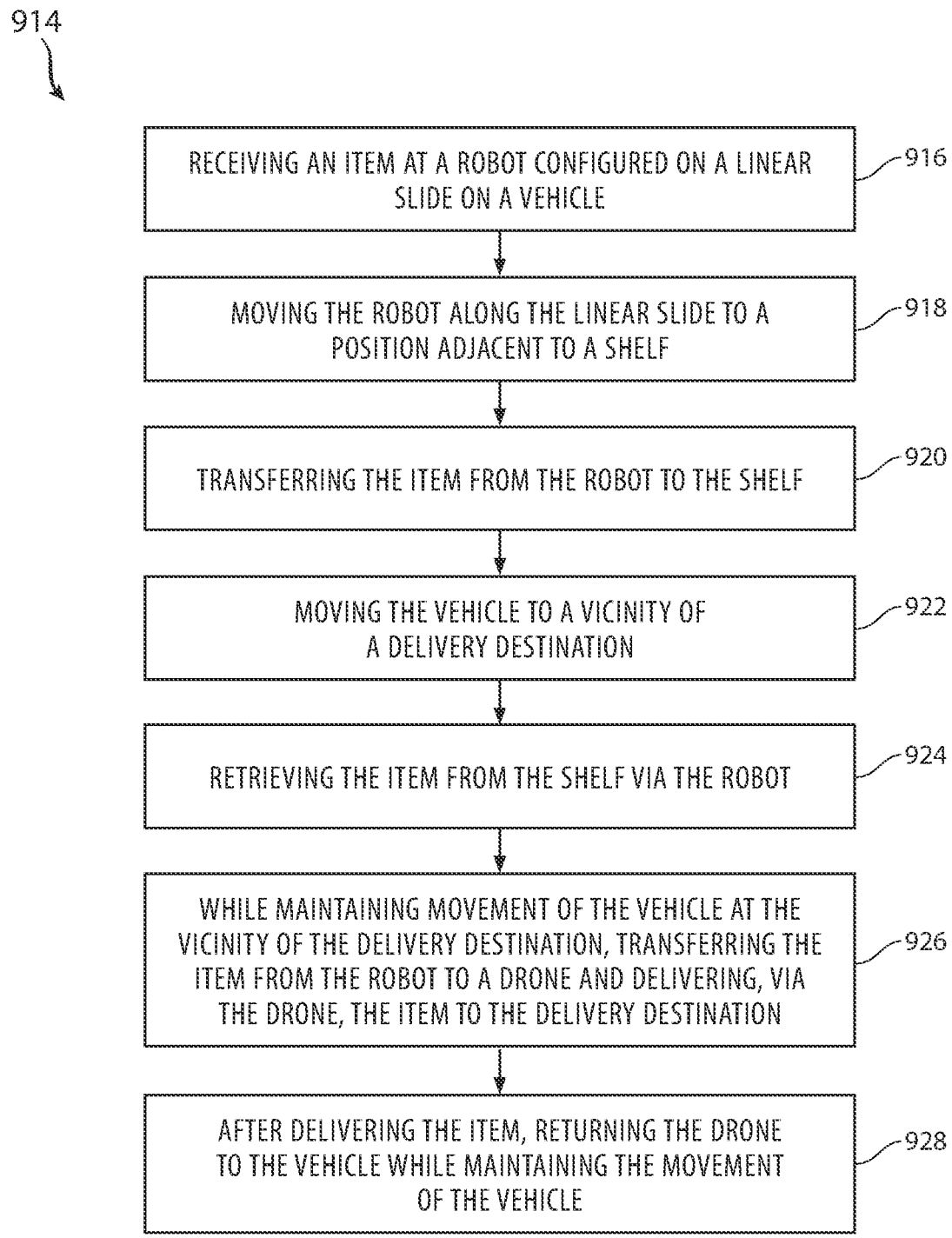

FIG. 9B illustrates another method 914 which relates to how the process can occur where the vehicle does not stop. A method 914 can include receiving an item at a robot configured on a linear slide on a vehicle (916), moving the robot along the linear slide to a position adjacent to a shelf (918), transferring the item from the robot to the shelf (920), moving the vehicle to a vicinity of a delivery destination (922), retrieving the item from the shelf via the robot (924) and, while maintaining movement of the vehicle at the vicinity of the delivery destination, transferring the item from the robot to a drone and delivering, via the drone, the item to the delivery destination (926). The method can further include, after delivering the item, returning the drone to the vehicle while maintaining the movement of the vehicle (928). Other aspects of this disclosure can include providing a recharging station on the vehicle for the drone, and/or include the ability of the drone to swap out a used battery for a charged battery. In one context, because the delivery trips may not necessarily be lengthy, and because packages can be large and heavy, the battery used for the drones disclosed herein can be smaller and lighter in that they do not necessarily need to operate the drone for long periods of time.

Other aspects of this disclosure also include a variety of various options within the context of the system disclosed herein for improving efficiency of package delivery. For example, the control system 304 can have all of the relative data related to individual packages and their characteristics such as their size and weight. Distances from the vehicle to respective destination locations can also be evaluated and other refinements can be provided in terms of drone delivery. For example, the control system 304 may know that a large package will soon be delivered to a relatively far destination from the vehicle. The control system can evaluate battery power likely to be needed in order to deliver the package and return the drone to the vehicle. Other factors can include the need for the drone to pick up additional packages from origination locations on the particular trip. In one example, the vehicle can be equipped with different sizes of batteries for the drones. Thus, rather than generically replacing a battery for a particular drone, the control system could evaluate the characteristics of individual trips for a drone relative to distances, package characteristics, weather, a desired speed, the route and any other factors to select a particular battery that might be required to fulfill a particular trip. Thus, in the case where packages need to be carried a longer distance, a drone 130 might have an existing battery (which is designed for a light packages and shorter trips) switched out for the larger battery with greater capacity. In another example, for a large package, the vehicle route might be altered to make the distance the drone 130 needs to travel shorter. The control system 304 might instruct the driver or an automated driving system to change the route to a new route that gets the vehicle closer to the destination location.

Drones of different characteristics could also be provided on a single vehicle. Thus, different classes of drones could also be made available such that the control system can manage the selection of a particular drone type, a particular battery type, and coordinate that information with the robot retrieval system 100. Other factors can include a location of the particular item on the shelf and at what depth the item is placed, and the timing of retrieval of the package and passing the package off to the proper drone for delivery. The one or more of the parameters described can be utilized to configure each respective trip of the drone for efficiency purposes.

In another aspect of this disclosure, particular destination locations such as homes or businesses or any other location, could also participate how drone delivery trips are configured. For example, a destination location could provide a charged battery which can be used by the drone to return to the vehicle. Inasmuch as it is desirable for the battery of the drone systems used herein to be small and light to enable the drone to carry the package to the destination location, one aspect of this disclosure could include the control system providing a message to a system or a person and a message to a destination location computing device to set out or make available a battery for the drone to use to exchange its use battery for the return trip.

In one aspect, for example, a station could be configured on the top of the building which has batteries available for swapping out with a delivery drone. The drone might deliver the package to a porch or a destination location with a battery that is about to expire. The drone could then rise up to a roof location or any other location and swap out its used battery for a fully-charged battery and return back to the vehicle. In this aspect, a system configured at a destination location can be in communication with the control system 304 (wirelessly or otherwise) on a vehicle such that the knowledge of an available charged battery, and of the battery type or any other information that might be necessary, is made available to the control system 304. In this regard, the control system 304 may enable or direct a drone 130 to deliver the package utilizing a battery that is not sufficiently large to enable the drone to return to the vehicle. However, because the control system 304 has knowledge of the availability of a battery at the destination location, the drone 130 does not need to carry such a large battery to cover both legs of the delivery trip.

In one aspect, by providing such a service of available charged batteries for a drone, a destination location can receive rewards such as discounts, faster delivery times, and so forth to incentivize a delivery destination to provide a battery swapping capability. A destination location could also provide a charging station which might also be utilized by the drone to charge a battery prior to returning to a vehicle. As noted above, a destination location, or community or entity, could also have its own drone that would coordinate with the vehicle to receive and deliver packages for that community. Once done, the drone would return to a station associated with the community rather than returning to the vehicle. As a delivery vehicle moves from community to community, a fully charged community-based drone can meet the vehicle and start to receive and deliver packages. In one aspect, the control system 304 might request such a drone to assist in package delivery exclusively or in coordination with a drone assigned to the vehicle for further efficiencies.

Figure 10:
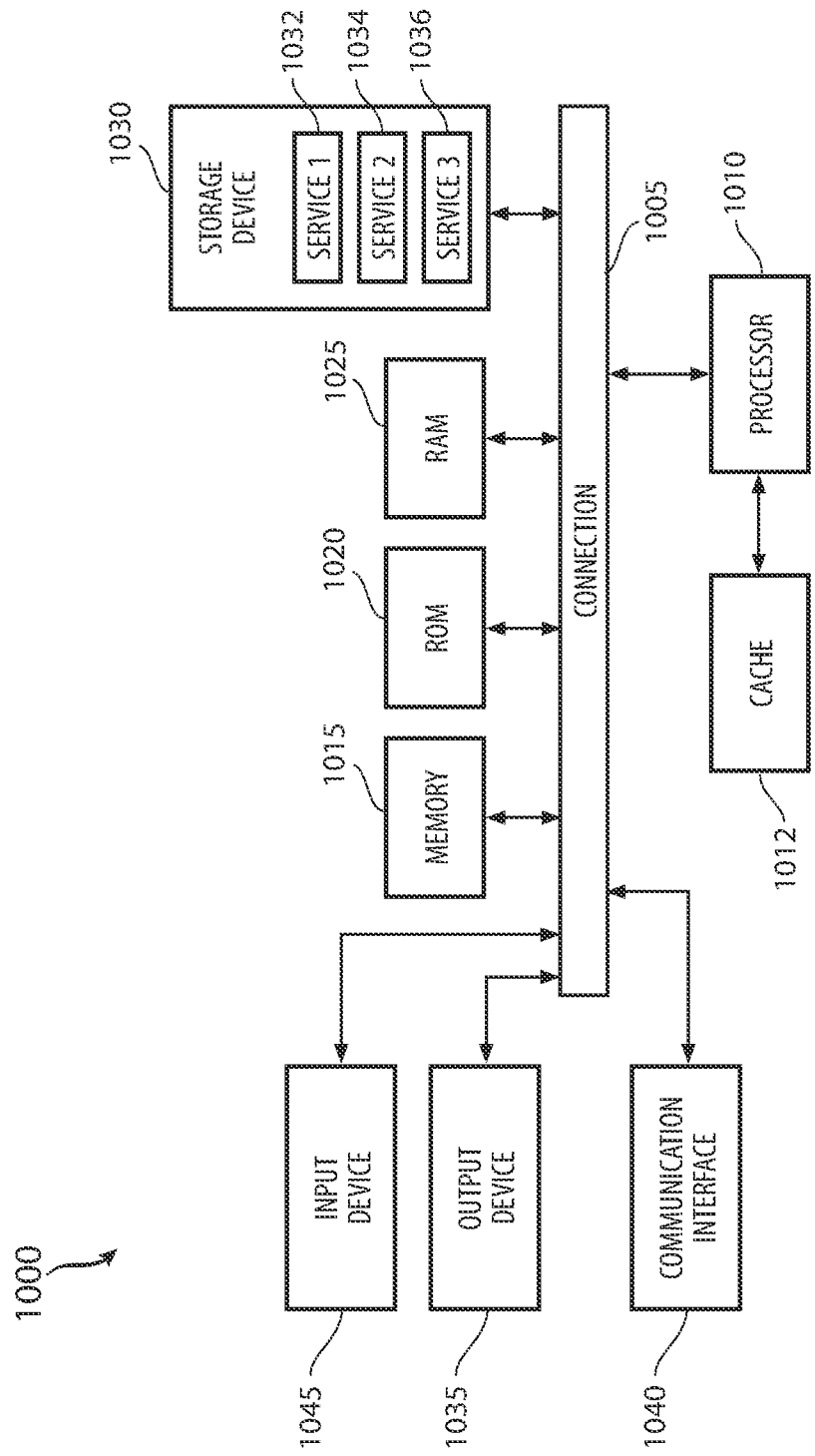
FIG. 10 illustrates example computing components used by various systems of the disclosure.

FIG. 10 illustrates example computer device that can be used in connection with any of the systems disclosed herein. In this example, FIG. 10 illustrates a computing system 1000 including components in electrical communication with each other using a connection 1005, such as a bus. System 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A system comprising:
   a vehicle having a platform supporting a set of multi-level shelves, the vehicle configured with wheels to drive on a road;
   a linear slide attached to the platform and configured within a housing of the vehicle, the linear slide configured to be adjacent to the set of multi-level shelves, wherein a first shelf of the set of multi-level shelves is configured adjacent to the linear slide on a first side of the linear slide and wherein a second shelf of the set of multi-level shelves is configured adjacent to the linear slide on a second side of the linear slide;
   a robotic retrieval system configured on the linear slide;
   a control system that controls a reception of items by the robotic retrieval system and a placement of the items on the set of multi-level shelves;
   a drone configured on a top surface of the vehicle;
   an item-securing mechanism associated with the drone; and
   an opening in the top surface of the vehicle, wherein the drone drops the item-securing mechanism through the opening to receive an item of the items from the robotic retrieval system and delivers the item to a destination location.

2. The system of claim 1, further comprising:
   a charging station configured within the vehicle that charges the drone as it is positioned on the top surface.

3. The system of claim 2, wherein the control system causes the robotic retrieval system to re-shuffle items on a shelf of the set of multi-level shelves between delivery locations to render the items more accessible for the item-securing mechanism.

4. The system of claim 1, further comprising a battery replacement station configured to enable the drone to replace a used battery with a charged battery while the drone is positioned on the vehicle.

5. The system of claim 1, wherein the drone retrieves a package from the destination location and the robotic retrieval system receives the package from the drone and places the package on a shelf of the set of multi-level shelves.

6. The system of claim 5, wherein the robotic retrieval system places the package double deep in the shelf for delivery to a collection center.

7. The system of claim 1, wherein the item-securing mechanism comprises one of a platform and a grabbing mechanism.

8. A method comprising:
   receiving an item at a robot configured on a linear slide configured in a housing on a vehicle, the vehicle configured with wheels to drive on a road and the vehicle configured with a platform having attached thereto the linear slide and a set of multi-level shelves, wherein a first shelf of the set of multi-level shelves is configured adjacent to the linear slide on a first side of the linear slide and wherein a second shelf of the set of multi-level shelves is configured adjacent to the linear slide on a second side of the linear slide;
   moving the robot along the linear slide to a position for storing the item on a shelf of the set of multi-level shelves and configured adjacent to the linear slide;
   moving the vehicle to a vicinity of a delivery destination;
   retrieving the item from the shelf via the robot; and
   transferring the item, via an opening in a top surface of the vehicle, from the robot to an item-securing mechanism associated with a drone and dropped down through the opening.

9. The method of claim 8, further comprising:
   delivering the item to the delivery destination by the drone.

10. The method of claim 9, wherein the vehicle does not stop when transferring the item from the robot to the drone and delivering the item to the delivery destination by the drone.

11. A method comprising:
    receiving an item at a robot configured on a linear slide configured in a housing on a vehicle, the vehicle configured with wheels to drive on a road and the vehicle configured with a platform having attached thereto the linear slide and a set of multi-level shelves, wherein a first shelf of the set of multi-level shelves is configured adjacent to the linear slide on a first side of the linear slide and wherein a second shelf of the set of multi-level shelves is configured adjacent to the linear slide on a second side of the linear slide;
    moving the robot along the linear slide to a position adjacent to a shelf of the set of multi-level shelves;
    transferring the item from the robot to the shelf;
    moving the vehicle to a vicinity of a delivery destination;
    retrieving the item from the shelf via the robot; and
    while maintaining movement of the vehicle at the vicinity of the delivery destination:
    transferring the item from the robot, via an opening in a top surface of the vehicle, to an item-securing mechanism associated with a drone, wherein the drone is configured on the top surface of the vehicle and wherein the drone drops the item-securing mechanism through the opening to receive the item from the robot; and
    delivering, via the drone, the item to the delivery destination.

12. The method of claim 11, further comprising:
    after delivering the item, returning the drone to the vehicle while maintaining the movement of the vehicle.

13. A system comprising:
    a vehicle having a platform, the vehicle configured with wheels to drive on a road and the platform supporting a set of multi-level shelves;
    a linear slide attached to the platform and configured in a housing of the vehicle, the linear slide configured to be adjacent to the set of multi-level shelves, wherein a first shelf of the set of multi-level shelves is configured adjacent to the linear slide on a first side of the linear slide and wherein a second shelf of the set of multi-level shelves is configured adjacent to the linear slide on a second side of the linear slide;
    a robotic retrieval system configured on the linear slide;
    a control system that controls a reception of an item by the robotic retrieval system and a placement of the item, by the robotic retrieval system, on one of the first shelf or the second shelf of the set of multi-level shelves; and a drone configured on a top surface of the vehicle, wherein in a vicinity of a destination location for the item, the control system causes the robotic retrieval system to perform at least one of:

retrieving, via the robotic retrieval system, the item from the first shelf or the second shelf, passing the item from the robotic retrieval system, via an opening in the top surface of the vehicle, to an item-securing mechanism associated with the drone and that is dropped down the opening, such that the item is delivered, via the drone, to the destination location;

receiving, from the drone, a package retrieved by the drone from the destination location; and storing the package on one of the first shelf or the second shelf.

14. The system of claim 13, wherein the control system causes the robotic retrieval system to shuffle items on the first shelf or the second shelf in between delivery of items to respective destination locations.

15. The system of claim 13, wherein the control system causes the drone to pick up the package from the destination location and transfer the package to the robotic retrieval system for placement on the first shelf or the second shelf.

16. The system of claim 13, wherein the vehicle does not stop when delivering the item, via the drone, to the destination location and/or retrieving, via the drone, the package from the destination location.

17. A system comprising:

a vehicle having a platform supporting a set of multi-level shelves, the vehicle configured with wheels to drive on a road;

a linear slide attached to the platform and configured in a housing of the vehicle, the linear slide configured to be adjacent to the set of multi-level shelves, wherein a first shelf of the set of multi-level shelves is configured adjacent to the linear slide on a first side of the linear slide and wherein a second shelf of the set of multi-level shelves is configured adjacent to the linear slide on a second side of the linear slide;

a robotic retrieval system configured on the linear slide;

a control system that controls a reception of a first item and a second item by the robotic retrieval system and a placement of the first item and the second item, by the robotic retrieval system, on a shelf of the set of multi-level shelves; and a first drone and a second drone configured on a top surface of the vehicle, wherein in a vicinity of a first destination location for the first item and a second destination location for the second item, the control system causes the robotic retrieval system to perform at least one of:

retrieving, via the robotic retrieval system, the first item from the shelf, passing the first item from the robotic retrieval system, via an opening in the top surface of the vehicle, to a first item-securing mechanism of the first drone, and delivering the first item, via the first drone, to the first destination location;

retrieving, via the robotic retrieval system, the second item from the shelf, passing the second item from the robotic retrieval system, via the opening in the top surface of the vehicle, to a second item-securing mechanism of the second drone configured on the vehicle, and delivering the second item, via the second drone, to the second destination location; and retrieving, via the first drone or the second drone, a package from a pickup destination location, passing the package from the first drone or the second drone to the robotic retrieval system, and storing the package on the shelf.

18. The system of claim 17, wherein delivering the first item via the first drone to the first destination location and delivering the second item via the second drone to the second destination location occurs at least in part simultaneously.

* * * * *